UNITED STATES PATENT OFFICE.

JOHANN EISCHER, OF MUNICH, GERMANY.

PROCESS OF MAKING PAINT.

SPECIFICATION forming part of Letters Patent No. 654,613, dated July 31, 1900.

Application filed July 17, 1899. Serial No. 724,165. (No specimens.)

*To all whom it may concern:*

Be it known that I, JOHANN EISCHER, a subject of the Emperor of Germany, residing at Munich, Bavaria, Empire of Germany, have invented an Improved Process for Producing Artists' Colors, of which the following is a full, clear, and exact description.

The present invention consists of a process for producing artists' colors, the object being to produce colors which may be quickly worked up and painted over or worked into each other and which will be capable of withstanding the effect of light, heat, and cold.

The process consists substantially in melting together about one hundred parts of dammar-resin and thirty parts of crystalline soda, allowing the result to cool, and then treating it with benzine, so as to dissolve all that portion which is soluble in the same, and subsequently filtering the same. By melting the dammar-resin with soda rosin-soap will be formed corresponding to the free resinous acid of the former substance. This soap is, however, insoluble in benzine, so that it will separate out in the same and be removed by the filtration. Thus the great advantage is attained that the color will be free of resinous acid, so that the actual colors will remain entirely unchanged in the mixed or worked-up color.

The next step in the process consists in melting amber, with an addition of poppy or other drying oil and spike-oil, and adding paraffin to the mixture. The proportions of this mixture vary with the color to be produced. As an example the following proportions are mentioned: one hundred parts of amber, six hundred parts of poppy-oil, six hundred parts of spike-oil, and three hundred parts of paraffin. This fluid is intimately mixed with the dammar-resin solution before mentioned, a considerable quantity of the latter mixture being employed. Thus the binding medium is produced. The coloring substance is mixed with this medium in the well-known manner either on the palette or in a color-mixing mill. The quantity of the binding medium employed varies with the kind of color. It is, however, important that the painting medium—the dammar-resin solution—be employed in quantities large enough to render the binding medium as poor as possible in oil, so that a rapid drying of the color may be attained without the addition of turpentine-oil or other drying medium.

The proportions given are all understood to be by weight.

I claim as my invention—

1. A process for producing artists' colors which consists in melting dammar-resin and crystalline soda together, treating the mixture, after having been allowed to cool, with benzine so as to dissolve the soluble portion, and then filtering, mixing the resultant solution or filtrate with a solution of amber, drying-oil and spike-oil and paraffin, and adding the coloring substance in the manner and for the purpose substantially as described.

2. A process for producing artists' colors which consists in first melting dammar-resin and crystalline soda together, allowing the mixture to cool and treating the same with benzine so as to dissolve the soluble portion, filtering the whole and adding to the filtrate a solution of amber, poppy-oil, spike-oil and paraffin, in the proportions about as specified, and finally adding to the result the coloring-matter in the manner and for the purpose substantially as described.

In witness whereof I have hereunto set my hand in the presence of two witnesses.

JOHANN EISCHER.

Witnesses:
 GG. SCHELLER,
 EMIL HENZEL.